(12) United States Patent
Miftakhov et al.

(10) Patent No.: US 10,431,997 B2
(45) Date of Patent: Oct. 1, 2019

(54) COMPUTERIZED INFORMATION SYSTEM FOR SMART GRID INTEGRATED ELECTRIC VEHICLE CHARGING AND ASSOCIATED METHOD

(71) Applicant: Electric Motor Werks, Inc., San Carlos, CA (US)

(72) Inventors: Valery Miftakhov, San Carlos, CA (US); Alexander Gurzhi, San Jose, CA (US); Chris Edgette, Oakland, CA (US); Alan White, Tiburon, CA (US)

(73) Assignee: Electric Motor Werks, Inc., San Carlos, CA (US)

( * ) Notice: Subject to any disclaimer, the term of this patent is extended or adjusted under 35 U.S.C. 154(b) by 207 days.

(21) Appl. No.: 15/004,980

(22) Filed: Jan. 24, 2016

(65) Prior Publication Data

US 2016/0236585 A1    Aug. 18, 2016

Related U.S. Application Data

(63) Continuation-in-part of application No. 14/853,955, filed on Sep. 14, 2015, now Pat. No. 9,987,941.

(60) Provisional application No. 62/050,147, filed on Sep. 14, 2014.

(51) Int. Cl.
| | |
|---|---|
| *H02J 7/00* | (2006.01) |
| *H04L 29/08* | (2006.01) |
| *B60L 53/63* | (2019.01) |
| *B60L 53/66* | (2019.01) |
| *B60L 58/12* | (2019.01) |

(52) U.S. Cl.
CPC ............ *H02J 7/0027* (2013.01); *B60L 53/63* (2019.02); *B60L 53/665* (2019.02); *B60L 58/12* (2019.02); *H04L 67/12* (2013.01); *Y02T 10/7055* (2013.01); *Y02T 90/168* (2013.01); *Y04S 30/12* (2013.01); *Y04S 40/18* (2018.05)

(58) Field of Classification Search
USPC .................................................. 320/106–115
See application file for complete search history.

(56) References Cited

U.S. PATENT DOCUMENTS

| | | | |
|---|---|---|---|
| 2010/0013436 A1* | 1/2010 | Lowenthal ............. | G06Q 30/04 320/109 |
| 2011/0106329 A1* | 5/2011 | Donnelly ................. | B60L 3/12 700/291 |
| 2014/0125279 A1* | 5/2014 | Juhasz ..................... | H02J 7/00 320/109 |

\* cited by examiner

*Primary Examiner* — Binh C Tat
(74) *Attorney, Agent, or Firm* — TransPacific Law Group; Pavel I. Pogodin, Esq.

(57) ABSTRACT

A system for charging an electric or hybrid-electric vehicle, the system incorporating: at least one vehicle charging station intermittently connectable to the vehicle; a control server comprising at least one processing unit and a memory; and a computerized information system comprising a display unit displaying a user interface and a user input unit, the computerized information system being communicatively connected to the control server via a data network, wherein the user interface comprises a charging priority selection portion for receiving, via the user input unit, a plurality of charging priorities from an operator of the vehicle, wherein the computerized information system transmits the received plurality of charging priorities to the control server and wherein the control server controls the at least one vehicle charging station based on the transmitted plurality of charging priorities.

18 Claims, 5 Drawing Sheets

COMPUTERIZED INFORMATION SYSTEM FOR SMART GRID INTEGRATED ELECTRIC VEHICLE CHARGING AND ASSOCIATED METHOD

CROSS-REFERENCE TO RELATED PATENT APPLICATION

This regular U.S. patent application relies upon, claims the benefit of priority from and is a continuation-in-part of U.S. patent application Ser. No. 14/853,955 filed on Sep. 14, 2015, which relies upon and claims the benefit of priority from U.S. provisional patent application No. 62/050,147, entitled "Grid Stabilization via a Large Distributed Collection of EV Charging Stations," filed on Sep. 14, 2014, both of which are incorporated by reference herein in their entirety. This patent application is also related to two U.S. patent applications entitled "SYSTEMS AND METHODS FOR ELECTRICAL CHARGING LOAD MODELING SERVICES TO OPTIMIZE POWER GRID OBJECTIVES" and "SYSTEMS AND METHODS FOR LOCAL AUTONOMOUS RESPONSE TO GRID CONDITIONS BY ELECTRIC VEHICLE CHARGING STATIONS AND OTHER SIMILAR LOADS", filed on the same day and incorporated herein by reference.

BACKGROUND OF THE INVENTION

Field of the Invention

The disclosed embodiments relate in general to the field of electric charging technology, such as electric vehicle charging, as well as to power grid management and, more specifically, to a computerized system for smart grid integrated electric vehicle charging.

Description of the Related Art

Electric and plug-in hybrid electric vehicle (EV and PHEV) owners today have some control over the vehicle charging cost when they charge their vehicles at their residences. Specifically, EV/PHEV owners subscribing to special EV charging tariffs offered by many local utilities are able to achieve the most significant vehicle charging cost reduction by charging at specific time(s) of the day. The most simple way to achieve this is to connect, or plug-in, the vehicle to the electricity supply line at times when the electricity costs are the lowest per the user-selected tariff. More advanced charging controls, disposed either onboard the EV/PHEV or embedded into the electric vehicle supply equipment (EVSE), allow owners to plug-in the vehicles anytime, but enable the charging only within the designated time-of-use (TOU), which owner specifies.

While current charging solutions make it somewhat easier for users to minimize cost of EV charging, they are not integrated with the smart grid to enable EV owners to participate in demand response (DR) programs using distributed energy resources (DER). Moreover, many EV/PHEV owners choose to drive their vehicles to minimize $CO_2$ emissions. Current charging solutions, however, don't provide visibility into what sources generate the electric energy used to charge their vehicles and what are the atmospheric $CO_2$ emissions associated with the charging.

Therefore, new and improved systems and methods are needed that would assist the EV/PHEV owner in selecting proper vehicle charging parameters based on the cost of electricity, owner's participation in DR programs, atmospheric $CO_2$ emissions impact, time necessary to charge the vehicle, required driving range on the vehicle charge, and the like.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a system for charging an electric or hybrid-electric vehicle, the system comprising: at least one vehicle charging station intermittently connectable to the vehicle; a control server comprising at least one processing unit and a memory; and a computerized information system incorporating a display unit displaying a user interface and a user input unit, the computerized information system being communicatively connected to the control server via a data network, wherein the user interface comprises a charging priority selection portion for receiving, via the user input unit, a plurality of charging priorities from an operator of the vehicle, wherein the computerized information system transmits the received plurality of charging priorities to the control server and wherein the control server controls the at least one vehicle charging station based on the transmitted plurality of charging priorities.

In one or more embodiments, the plurality of charging priorities comprises a charge time priority.

In one or more embodiments, the plurality of charging priorities comprises a target state of charge priority.

In one or more embodiments, the plurality of charging priorities comprises an electricity price priority.

In one or more embodiments, the plurality of charging priorities comprises an electric energy source priority.

In one or more embodiments, the plurality of charging priorities comprises participation in demand response programs priority.

In one or more embodiments, the computerized information system is a mobile device of the operator of the vehicle.

In one or more embodiments, the at least one vehicle charging station receives at least one charging control command from the control server via the data network.

In one or more embodiments, the at least one charging control command comprises charging start and charging stop commands.

In one or more embodiments, the control server is communicatively coupled, via the data network, to a smart grid infrastructure and the control server receives at least one real-time data stream from the smart grid infrastructure.

In one or more embodiments, the at least one data stream comprises real time electricity pricing data.

In one or more embodiments, the at least one data stream comprises real time atmospheric emissions data.

In one or more embodiments, the at least one data stream comprises real time electricity demand data.

In one or more embodiments, the at least one data stream comprises real time event data.

In one or more embodiments, the computerized information system is disposed onboard of the vehicle.

In one or more embodiments, the computerized information system is disposed on the at least one vehicle charging station.

In one or more embodiments, the charging priority selection portion of the user interface comprises a plurality of user interface widgets, each of the plurality of user interface widgets corresponding to a charging priority from the plurality of charging priorities.

In one or more embodiments, each of the plurality of user interface widgets is a slider widget.

In accordance with another aspect of the embodiments described herein, there is provided a computer-implemented method for charging an electric or hybrid-electric vehicle, the method being performed in connection with a system incorporating at least one vehicle charging station intermittently connectable to the vehicle, a control server comprising at least one processing unit and a memory and a computerized information system incorporating a display unit and a user input unit, the computerized information system being communicatively connected to the control server via a data network, the method involving: displaying a user interface on the display unit, the user interface comprises a charging priority selection portion; receiving, via the user input unit, a plurality of charging priorities from an operator of the vehicle; transmitting the received plurality of charging priorities to the control server; and controlling the at least one vehicle charging station based on the transmitted plurality of charging priorities.

In accordance with yet another aspect of the embodiments described herein, there is provided a non-transitory computer-readable medium embodying a set of instructions, which, when executed in connection with a system incorporating at least one vehicle charging station intermittently connectable to the vehicle, a control server comprising at least one processing unit and a memory and a computerized information system incorporating a display unit and a user input unit, the computerized information system being communicatively connected to the control server via a data network, cause the system to perform a method involving: displaying a user interface on the display unit, the user interface comprises a charging priority selection portion; receiving, via the user input unit, a plurality of charging priorities from an operator of the vehicle; transmitting the received plurality of charging priorities to the control server; and controlling the at least one vehicle charging station based on the transmitted plurality of charging priorities.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one or more embodiments described herein, there is provided a novel computerized information system for smart grid integrated electric vehicle charging. In various embodiments, the novel information system is configured for delivering predetermined information to electric vehicle owners through a variety of different channels and/or user interfaces.

Figure 1:
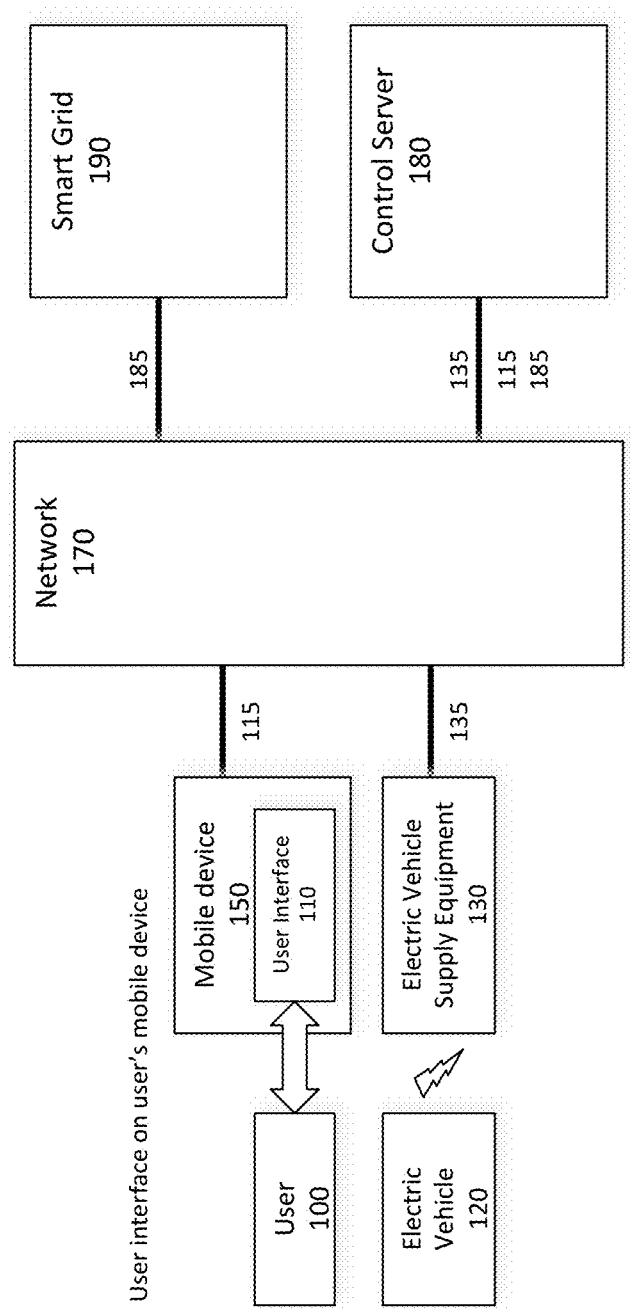
FIG. 1 illustrates a logical diagram of an exemplary embodiment of a novel computerized system for smart grid integrated electric vehicle charging.

FIG. 1 illustrates a logical diagram of an exemplary embodiment of a novel computerized system for smart grid integrated electric vehicle charging. As shown in FIG. 1, user 100, who may be an electric or hybrid vehicle (EV/PHEV) owner, view and interacts with user interface 110 displayed on a user's mobile device 150. In one or more embodiments, the mobile device 150 (for example smartphone or tablet) is executing a mobile software application, which implements the inventive user interface 110 and communicates (115) with the control server 180 via a data network 170. In one or more embodiments, the user interface 110 displayed on the user's mobile device 150 enables the user to select priorities and manage various trade-offs in accordance with user's main objectives, which may be determined based on the following and other factors:

1. How much time is available to reach a targeted state-of-charge? For example, if the user operates on a specific schedule, such as being in the office by 9 AM, then one of the user's priorities may be having the electric vehicle fully charged for the morning drive to work, say at 8 AM. As would be appreciated by persons of ordinary skill in the art, such priority may depend on the day of the week as well.

2. What is the targeted state-of-charge (SOC)? This can be expressed, for example, as a percentage of total battery capacity, or stored energy (in kWh), or estimated driving range. For example, if the user's drive to work is 10 miles, the user may not need fully charged battery. 30% of the battery charge may be sufficient for the user to get to work and back.

3. What is the acceptable cost of electricity (per kWh) threshold or total for charging to targeted SOC? For cost-sensitive users the cost of electricity may be an important factor.

4. Participation in Smart Grid demand response or other DER programs. Some users may choose to participate in such programs.

5. CO2 emissions impact of vehicle charging. For example, charging user's electric vehicle only from "green" energy sources as opposed to any sources, including potentially high CO2 emission sources, may be a significant factor for environmentally conscious users.

As would be appreciated by persons of ordinary skill in the art, in various embodiments, other priorities and/or objectives may be added to the above-described framework without departing from the spirit and scope of the described invention.

In one or more embodiments, as shown in FIG. 1, the user interface 110 transmits the information on the aforesaid user-selected priorities (115) to a control server (180) through the data network (170) and receives back various information to display to the user on a display unit of the mobile device 150 (also 115 in FIG. 1) from the control server (180) through the network (170). The network 170, which may be implemented, for example, using the suite of TCP/IP protocols, well known in the art, provides means to transmit data and commands (115, 135, 185) between various components of the system shown in FIG. 1.

In the embodiment shown in FIG. 1, electric or hybrid vehicle (EV/PHEV) 120 is connected to and being charged by electric vehicle supply equipment (EVSE) 130. The EVSE 130 is connected, via the network 170 to the control server (180) and sends telemetry to, and receives charging control commands (135) from this control server (180). It should be noted that in the system shown in FIG. 1, the EVSE 130 does not offer a separate user interface (UI).

In the embodiment shown in FIG. 1, a smart grid 190 incorporates a collection of network programming interfaces (services) which enable the control server (180) to perform one, some or all of the following functions: receive live steams of pricing and atmospheric emissions data associated with electric energy generation; receive real-time or nearly real-time grid events notifications; and submit actions participating in smart grid economic and emission control programs.

In one or more embodiments, the control server 180 is a main processor, which, via the network (170) receives multiple inputs, runs program and sends output to other components of the system. Specifically, in one or more embodiments, the control server 180 receives and stores user input/preferences (115) from user interface instance(s) (110). Storing and processing input at central node allows synchronize multiple user interface instances. For example, control the same EV charging session both from EVSE display and user's smartphone.

In one or more embodiments, the control server 180 also queries pricing, emissions, and other data streams (185) relevant for user requested charging behavior from the smart grid (190) programming interfaces. In one or more embodiments, the control server 180 is further configured to continuously compute, based on all of the received data inputs, a charging rate and schedule, which satisfies the specific user needs for the current charging session. In one or more embodiments, the charging rate is calculated within a user-preset range, which is determined by the EV/PHEV, EVSE and power line constraints as well as user preferences.

In one or more embodiments, if participation in one or more smart grid programs (for example: demand response or atmospheric emissions minimization) is desired, the control server 180 further computes various actions to be sent to the smart grid (190). Moreover, the control server 180 may be further configured to send program output to other components of the system. Specifically, it may periodically send, based on the calculated schedule updates (135) charging rate of the connected EV/PHEV (120) or EVSE (130). In addition, the control server 180 may be configured to send requests (185) participating in smart grid programs. In one or more embodiments, as values of predetermined variables change, the control server 180 may be configured to send information updates (115) to display on the user interface (110) generated using the user's mobile device 150.

Figure 2:
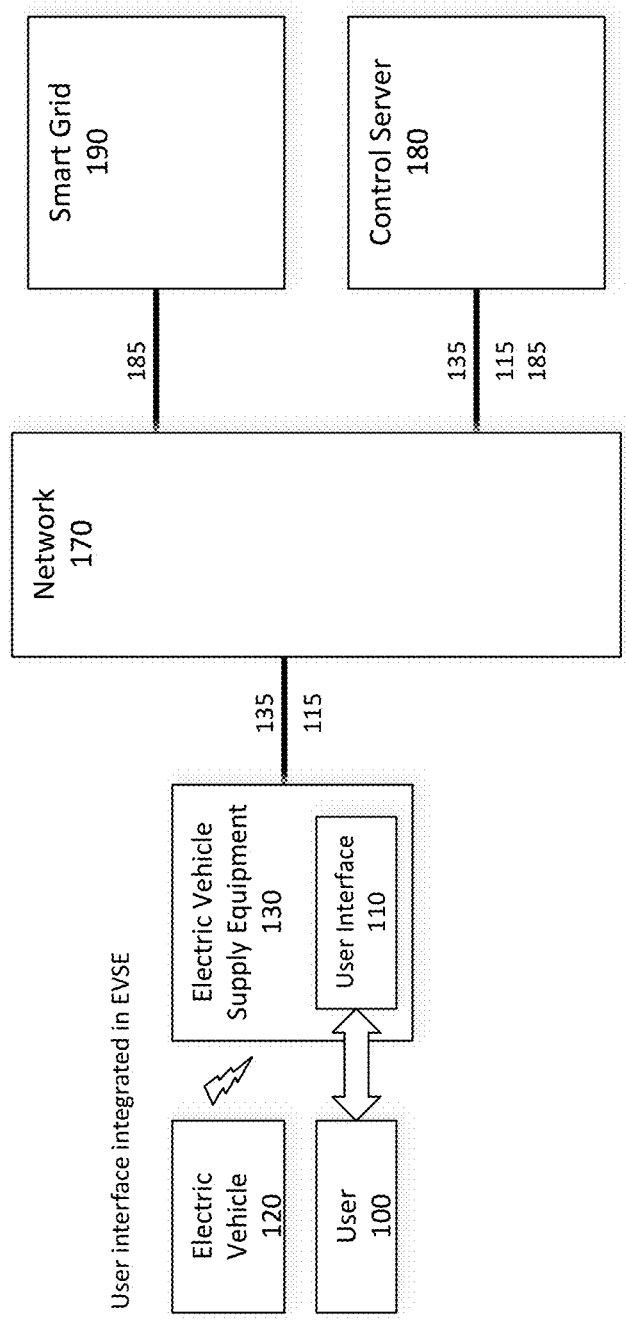
FIG. 2 illustrates a logical diagram of another exemplary embodiment of a novel computerized system for smart grid integrated electric vehicle charging.

FIG. 2 illustrates a logical diagram of another exemplary embodiment of a novel computerized system for smart grid integrated electric vehicle charging. In this embodiment, a network-connected EV/PHEV charging station (EVSE) 130 sends telemetry to, receives control commands (135) from the control server (180), and incorporates a display unit and a user input mechanism, such as a keyboard or display's touch-screen interface, to implement the described user interface (110).

Figure 3:
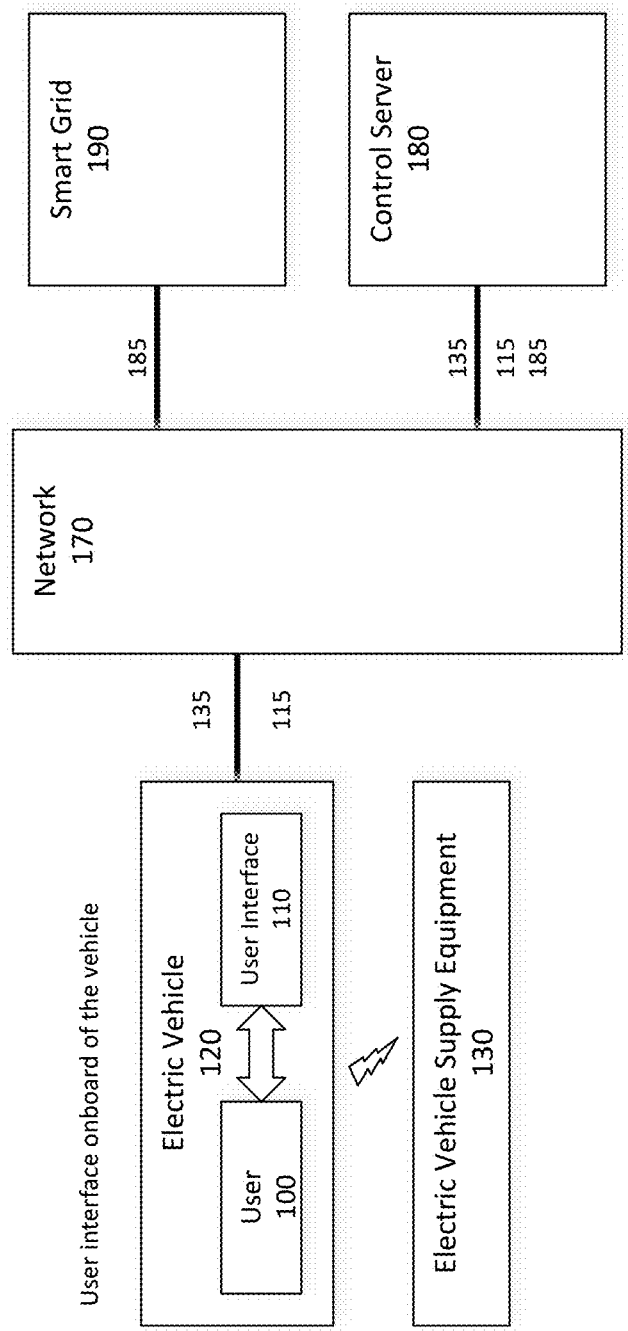
FIG. 3 illustrates a logical diagram of yet another exemplary embodiment of a novel computerized system for smart grid integrated electric vehicle charging.

FIG. 3 illustrates a logical diagram of yet another exemplary embodiment of a novel computerized system for smart grid integrated electric vehicle charging. In this embodiment, vehicle's 120 own (onboard) equipment includes network connectivity for connecting the vehicle 120, through the network 170, to the control server (180), and display and user input devices capable of implementing the inventive user interface (110) described herein. In this embodiment, the control commands (135) as well as the user-selected priorities (115) are communicated via the network 170 between the vehicle 120 and the control server 180. It should be noted that in the embodiment shown in FIG. 3, the EVSE 130 may not have a server control capability.

Figure 4:
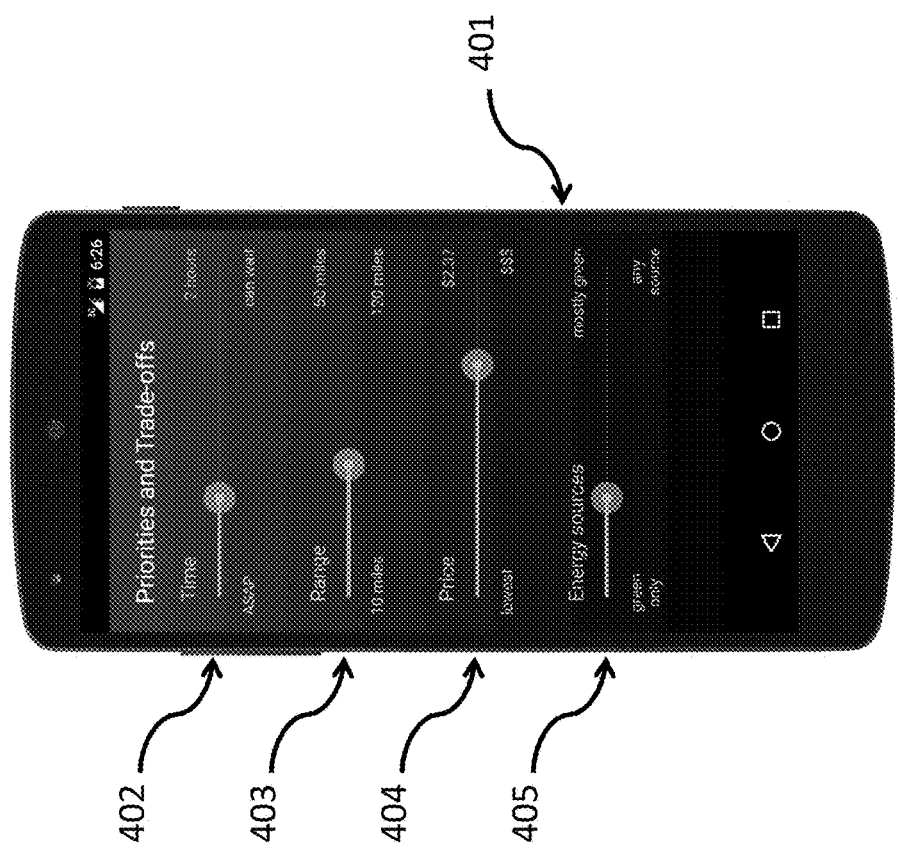
FIG. 4 illustrates a graphical use interface generated on a user's mobile device by an exemplary embodiment of a novel computerized system for smart grid integrated electric vehicle charging.

FIG. 4 illustrates a graphical use interface 401 generated on a user's mobile device by an exemplary embodiment of a novel computerized information system for smart grid integrated electric vehicle charging. As shown in FIG. 4, the user interface 401 provides the user (EV/PHEV owner) 100 with four separate user interface control widgets 402-405 for setting different charging priorities. The widgets shown in FIG. 4 are slider widgets, however any other user interface control widget types may be used instead without departing from the spirit and scope of the present invention.

The first shown control widget 402 affects the EV/PHEV battery charge time. Specifically, the user can use this user interface control widget to specify how much time is available to reach the targeted state-of-charge (SOC) of the vehicle. In the embodiment of the user interface shown in FIG. 4, the user-specified charging time ranges from "as soon as possible" (ASAP) to "can wait" and the user-selected time is 2 hours, see FIG. 4.

The second user control widget 403 of the user interface 401 shown in FIG. 4 specifies the desired driving range of the electric vehicle charge also called the targeted vehicle state-of-charge (SOC). In various embodiments, the aforesaid SOC may be expressed, for example, as a percentage of total battery capacity, or stored energy (in kWh), or estimated driving range. In the embodiment shown in FIG. 4, the driving range is expressed in miles and ranges from 10 miles to 120 miles. The user has selected 50 miles.

The third user control widget 404 of the user interface 401 shown in FIG. 4 specifies the acceptable to the user cost of electricity (per kWh) threshold or total cost for charging to targeted SOC. The user-selected cost is $2.37 to reach a charge sufficient for 50 mile vehicle driving range.

Finally, the fourth, last user control widget 405 of the user interface 401 shown in FIG. 4 indicates the user's desired CO2 emissions impact of vehicle battery charging. For example, using this widget the user can select charging only from "green" energy sources or any sources including potentially high emission sources. In FIG. 4, the user selected "mostly green" electric energy sources for vehicle charging.

Similarly, in another embodiment, a user control widget may be provided (not shown) enabling the user to choose to participate in smart grid demand response or other DER programs. As would be appreciated by persons of ordinary skill in the art, in various embodiments, other priorities and/or objectives may be added to the above-described framework without departing from the spirit and scope of the described invention.

In various embodiments, the user interface 401 shown in FIG. 4 may be implemented on the vehicle onboard display, EVSE or any other platform available to the user, which includes a display, input mechanism and Internet connectivity.

In various embodiments, a user interface similar to the user interface 401 shown in FIG. 4 may be used by the EV/PHEV owner to specify priorities for both default and charging session-specific behavior. For example, through the user interface similar to the one shown in FIG. 4, the EV/PHEV owner may specify the following preferences for default charging behavior: allow charge between 11 pm and 7 am, while participating in demand response programs and control charge rate as needed, as long as sources of the energy is mostly green, and EV is fully charged by 8 am on weekdays and 9 am on weekends.

In various embodiments, occasionally, EV owners may want to override default settings otherwise automatically honored by the charging solution, and specify different preferences for the current charging session, for example: "add at least 50 miles of estimated driving range within next 2 hours." In various embodiments, the user interface may also show the default cost of this charging session and CO2 emissions impact.

In various embodiments, the user interface may be implemented using a display and user input controls available on a particular platform which allow users to set order and priority of the tradeoffs and their parameters. Attached image illustrates implementation of the user interface on smartphone using ordered list of slider controls.

In various embodiments, the user interface also enable the user to specify notifications preferences, such as media, including, without limitation, email, SMS, and/or in-app messages. The user may also be able to specify the types of charging-related events that would trigger the user notifications, including, for example, reaching the desired state of charge and/or charging rate reduction on smart grid signal triggered by demand response (DR) or atmospheric emissions.

Exemplary Computer Platform

Figure 5:
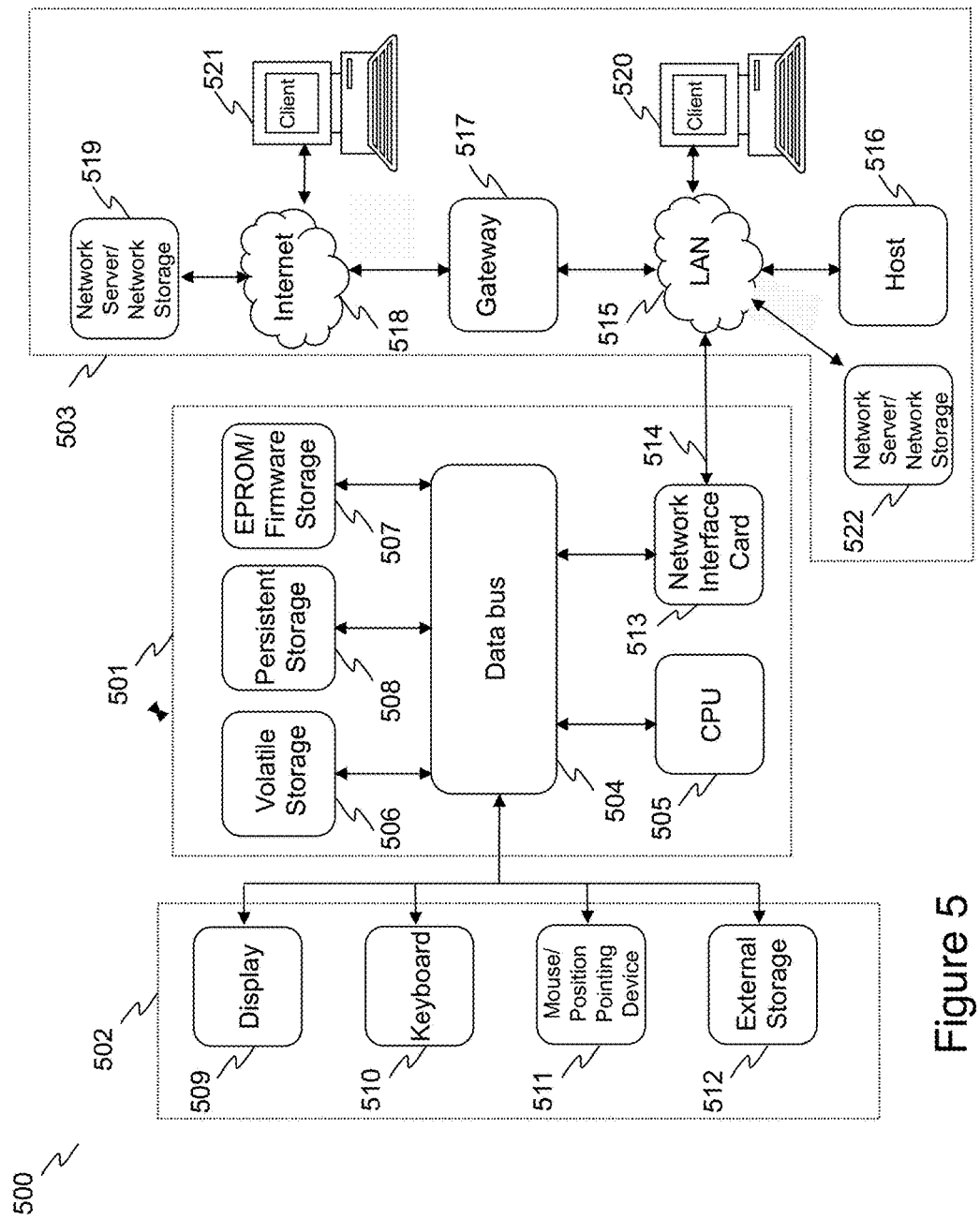
FIG. 5 is a block diagram that illustrates an embodiment of a computer/server platform upon which various embodiments of a novel computerized information system for smart grid integrated electric vehicle charging described herein may be deployed.

FIG. 5 is a block diagram that illustrates an embodiment of a computer/server system 500 upon which an embodiment of the inventive methodology may be implemented. The system 500 includes a computer/server platform 501, peripheral devices 502 and network resources 503. As would be appreciated by persons of ordinary skill in the art, various embodiments described hereinabove may be deployed based on the aforesaid computer/server system 500.

The computer platform 501 may include a data bus 505 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 505 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 505 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 505 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 505. The bus 505 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 505. Communication interface 513 provides a two-way data communication coupling to a network link 515 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 515 typically provides data communication through one or more networks to other network resources. For example, network link 515 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in a computerized information system for smart grid integrated electric vehicle charging. It is intended that the specification and examples be considered as exemplary only, with a true scope and spirit of the invention being indicated by the following claims.

What is claimed is:

1. A system for charging an electric or hybrid-electric vehicle, the system comprising:
   a. at least one vehicle charging station intermittently connectable to the vehicle;
   b. a control server comprising at least one processing unit and a memory, wherein the control server is communicatively coupled, via the data network, to a smart grid infrastructure and the control server receives at least one real-time data stream from the smart grid infrastructure and
   c. a computerized information system comprising a display unit displaying a user interface and a user input unit, the computerized information system being communicatively connected to the control server via a data network, wherein the user interface comprises a charging priority selection portion for receiving, via the user input unit, a plurality of charging priorities from an operator of the vehicle, wherein the computerized information system transmits the received plurality of charging priorities to the control server and wherein the control server controls the at least one vehicle charging station based on the transmitted plurality of charging priorities, wherein the charging priority selection portion of the user interface comprises a plurality of user interface widgets, each of the plurality of user interface widgets corresponding to a charging priority from the plurality of charging priorities.

2. The system for charging an electric or hybrid-electric vehicle of claim 1, wherein the plurality of charging priorities comprises a charge time priority.

3. The system for charging an electric or hybrid-electric vehicle of claim 1, wherein the plurality of charging priorities comprises a target state of charge priority.

4. The system for charging an electric or hybrid-electric vehicle of claim 1, wherein the plurality of charging priorities comprises an electricity price priority.

5. The system for charging an electric or hybrid-electric vehicle of claim 1, wherein the plurality of charging priorities comprises an electric energy source priority.

6. The system for charging an electric or hybrid-electric vehicle of claim 1, wherein the plurality of charging priorities comprises participation in demand response programs priority.

7. The system for charging an electric or hybrid-electric vehicle of claim 1, wherein the computerized information system is a mobile device of the operator of the vehicle.

8. The system for charging an electric or hybrid-electric vehicle of claim 1, wherein the at least one vehicle charging station receives at least one charging control command from the control server via the data network.

9. The system for charging an electric or hybrid-electric vehicle of claim 1, wherein the at least one charging control command comprises charging start and charging stop commands.

10. The system for charging an electric or hybrid-electric vehicle of claim 9, wherein the at least one data stream comprises real time electricity pricing data.

11. The system for charging an electric or hybrid-electric vehicle of claim 9, wherein the at least one data stream comprises real time atmospheric emissions data.

12. The system for charging an electric or hybrid-electric vehicle of claim 9, wherein the at least one data stream comprises real time electricity demand data.

13. The system for charging an electric or hybrid-electric vehicle of claim 9, wherein the at least one data stream comprises real time event data.

14. The system for charging an electric or hybrid-electric vehicle of claim 1, wherein computerized information system is disposed onboard of the vehicle.

15. The system for charging an electric or hybrid-electric vehicle of claim 1, wherein computerized information system is disposed on the at least one vehicle charging station.

16. The system for charging an electric or hybrid-electric vehicle of claim 1, wherein each of the plurality of user interface widgets is a slider widget.

17. A computer-implemented method for charging an electric or hybrid-electric vehicle, the method being performed in connection with a system comprising at least one vehicle charging station intermittently connectable to the vehicle, a control server comprising at least one processing unit and a memory and a computerized information system comprising a display unit and a user input unit, the computerized information system being communicatively connected to the control server via a data network, the method comprising:
 a. displaying a user interface on the display unit, the user interface comprises a charging priority selection portion, wherein the charging priority selection portion of the user interface comprises a plurality of user interface widgets, each of the plurality of user interface widgets corresponding to a charging priority from the plurality of charging priorities
 b. receiving, via the user input unit, a plurality of charging priorities from an operator of the vehicle;
 c. transmitting the received plurality of charging priorities to the control server, wherein the control server is communicatively coupled, via the data network, to a smart grid infrastructure and the control server receives at least one real-time data stream from the smart grid infrastructure and
 d. controlling the at least one vehicle charging station based on the transmitted plurality of charging priorities.

18. A non-transitory computer-readable medium embodying a set of instructions, which, when executed in connection with a system comprising at least one vehicle charging station intermittently connectable to the vehicle, a control server comprising at least one processing unit and a memory and a computerized information system comprising a display unit and a user input unit, the computerized information system being communicatively connected to the control server via a data network, cause the system to perform a method comprising:
 a. displaying a user interface on the display unit, the user interface comprises a charging priority selection portion, wherein the charging priority selection portion of the user interface comprises a plurality of user interface widgets, each of the plurality of user interface widgets corresponding to a charging priority from the plurality of charging priorities
 b. receiving, via the user input unit, a plurality of charging priorities from an operator of the vehicle;
 c. transmitting the received plurality of charging priorities to the control server, wherein the control server is communicatively coupled, via the data network, to a smart grid infrastructure and the control server receives at least one real-time data stream from the smart grid infrastructure and
 d. controlling the at least one vehicle charging station based on the transmitted plurality of charging priorities.

* * * * *